(12) United States Patent
Shu

(10) Patent No.: US 9,404,726 B2
(45) Date of Patent: Aug. 2, 2016

(54) PROFILE GAUGE

(71) Applicant: Yung-Long Shu, Taichung (TW)

(72) Inventor: Yung-Long Shu, Taichung (TW)

( * ) Notice: Subject to any disclaimer, the term of this patent is extended or adjusted under 35 U.S.C. 154(b) by 122 days.

(21) Appl. No.: 14/525,229

(22) Filed: Oct. 28, 2014

(65) Prior Publication Data
US 2015/0377601 A1 Dec. 31, 2015

(30) Foreign Application Priority Data
Jun. 25, 2014 (TW) .................................. 103211231

(51) Int. Cl.
*G01B 5/20* (2006.01)
*G01B 5/207* (2006.01)

(52) U.S. Cl.
CPC ....................................... *G01B 5/207* (2013.01)

(58) Field of Classification Search
CPC ...... G01B 5/008; G01B 5/0004; G01B 21/30; G01B 5/012; G01B 21/047; G01B 21/20; G01B 3/04; G01B 5/0025
USPC .......................................... 33/561.1, 526, 527
See application file for complete search history.

(56) References Cited

U.S. PATENT DOCUMENTS

| | | | | |
|---|---|---|---|---|
| 7,117,610 B2 * | 10/2006 | Bailey | ..................... | E04F 21/20 33/526 |
| 7,318,286 B1 * | 1/2008 | Willette | ................. | A47C 7/462 33/512 |
| 7,493,704 B2 * | 2/2009 | Bailey | ..................... | E04F 21/20 33/526 |
| 7,654,021 B2 * | 2/2010 | Kleyman | ............... | G01B 5/207 33/561.1 |
| 8,294,758 B2 * | 10/2012 | Lynde | ..................... | E21B 31/00 33/552 |
| 9,237,819 B1 * | 1/2016 | Marks | ..................... | A47G 1/205 |
| 2001/0029679 A1 * | 10/2001 | Peters | ........................ | B43L 9/00 33/561.3 |
| 2010/0212197 A1 * | 8/2010 | Kleyman | .................. | F02F 1/16 33/561.1 |
| 2012/0266472 A1 * | 10/2012 | Liza | .................... | E04F 21/0076 33/527 |

* cited by examiner

*Primary Examiner* — Yaritza Guadalupe-McCall

(57) ABSTRACT

A profile gauge contains: a body, a holding plate, a plurality of slidable measuring members, and a locking assembly. The body is formed in an elongated plate shape and includes an accommodating chamber defined thereon and two ruling portions parallelly arranged on two sides of the accommodating chamber, wherein each ruling portion has a graduation for measuring a distance between two points of a profile curve line of an object. The holding plate is rectangular and includes an insertion extending outwardly from a first end thereof and an extension extending outwardly from a second end thereof. Each slidable measuring member includes a fixed thickness and an elongated aperture defined thereon, wherein a width of the elongated aperture is more than a width between the two sides of the holding plate. The locking assembly is fixed on the extension to limit a slidable movement of each slidable measuring member.

3 Claims, 6 Drawing Sheets

PROFILE GAUGE

FIELD OF THE INVENTION

The present invention relates to a profile gauge which fixes a profile curve line of an object unchanged quickly and easily.

BACKGROUND OF THE INVENTION

A conventional profile gauge contains a plurality of slidable measuring members slidably moved to align with a profile curve line of an object. However, after the plurality of slidable measuring members are moved to align with the profile curve line of an object, they cannot be fixed precisely.

The present invention has arisen to mitigate and/or obviate the afore-described disadvantages.

SUMMARY OF THE INVENTION

The primary object of the present invention is to provide a profile gauge which fixes a profile curve line of an object unchanged quickly and easily.

To obtain the above objective, a profile gauge contains: a body, a holding plate, a plurality of slidable measuring members, and a locking assembly.

The body is formed in an elongated plate shape and includes a predetermined length, an accommodating chamber defined thereon, and two ruling portions parallelly arranged on two sides of the accommodating chamber; wherein each ruling portion has a graduation for measuring a distance between two points of a profile curve line of an object.

The holding plate is rectangular and includes an insertion extending outwardly from a first end thereof and an extension extending outwardly from a second end thereof.

Each slidable measuring member includes a fixed thickness and an elongated aperture defined thereon, wherein a width of the elongated aperture is more than a width between the two sides of the holding plate.

The locking assembly is fixed on the extension of the holding plate to limit a slidable movement of each slidable measuring member.

DETAILED DESCRIPTION OF THE PREFERRED EMBODIMENTS

Figure 1:
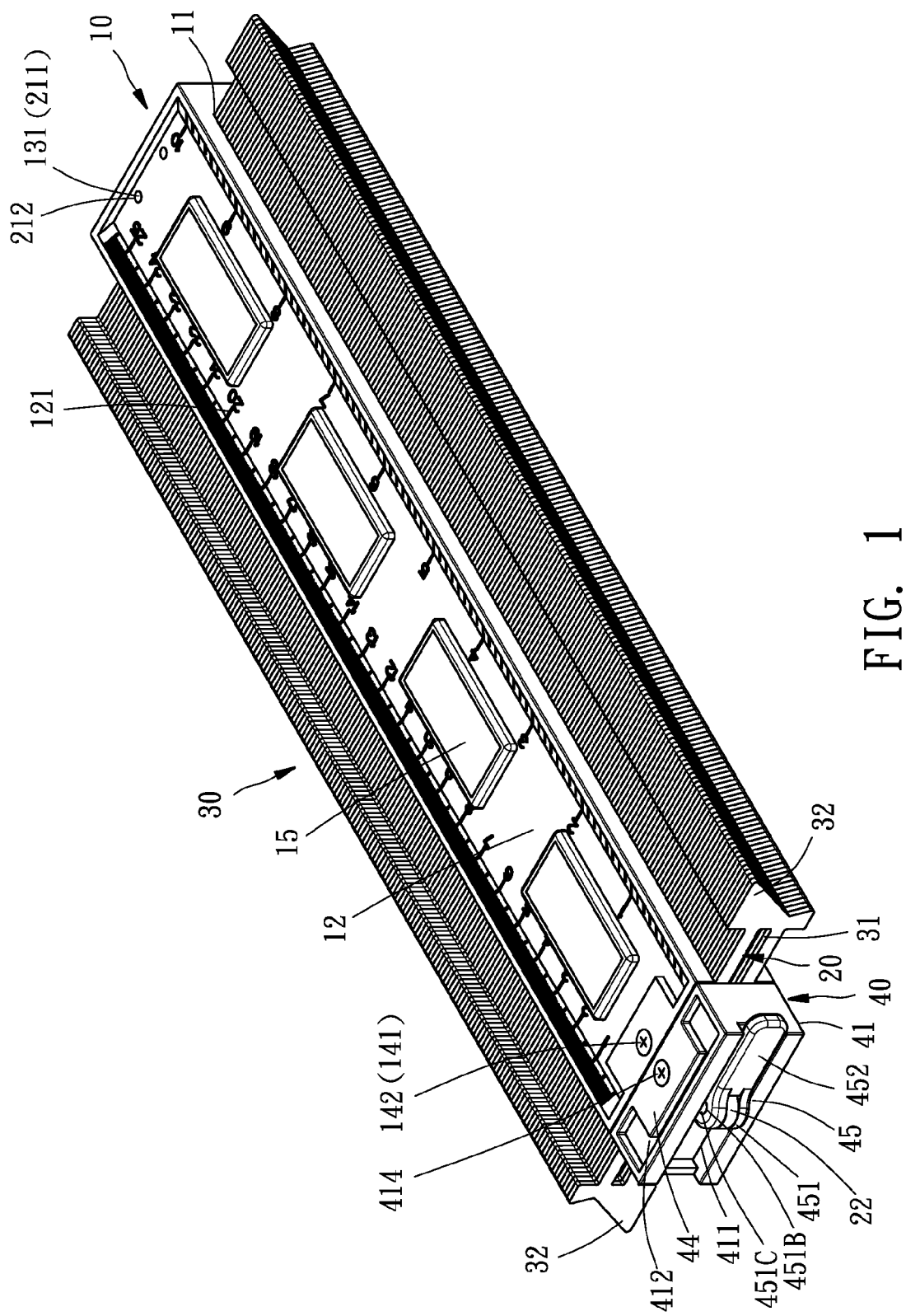
FIG. 1 is a perspective view showing the assembly of a profile gauge according to a preferred embodiment of the present invention.

With reference to FIGS. 1 to 6, a profile gauge according to a preferred embodiment of the present invention comprises: a body 10, a holding plate 20, a plurality of slidable measuring members 30, and a locking assembly 40.

The body 10 is formed in an elongated plate shape and includes a predetermined length, an accommodating chamber 11 defined thereon, and two ruling portions 12 parallelly arranged on two sides of the accommodating chamber 11; wherein each ruling portion 12 has a graduation 121 for measuring a distance between two points of a profile curve line of an object. The body 10 also includes a positioning seat 13 disposed on a bottom surface of a distal end thereof, and the positioning seat 13 has a first screwing hole 131. The body 10 further includes two recesses 14 symmetrically formed on two ends thereof, and each recess 14 has a second screwing hole 141. The body 10 further includes plural magnets 15 separately mounted on at least one of the two ruling portions 12 thereof to magnetically attach the body 10 on the object made of magnetic metal material.

Figure 2:
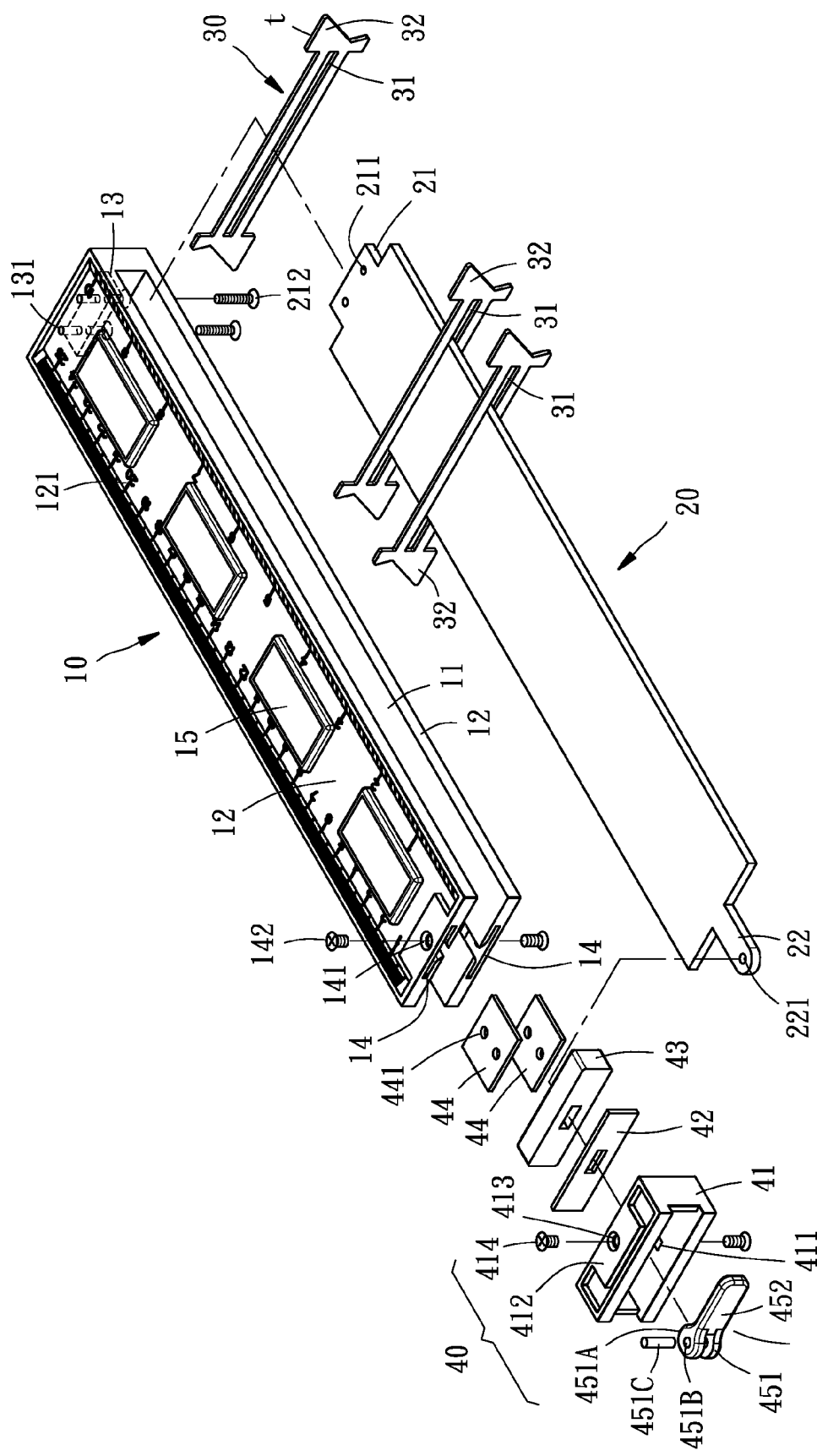
FIG. 2 is a perspective view showing the exploded components of the profile gauge according to the preferred embodiment of the present invention.
Figure 3:
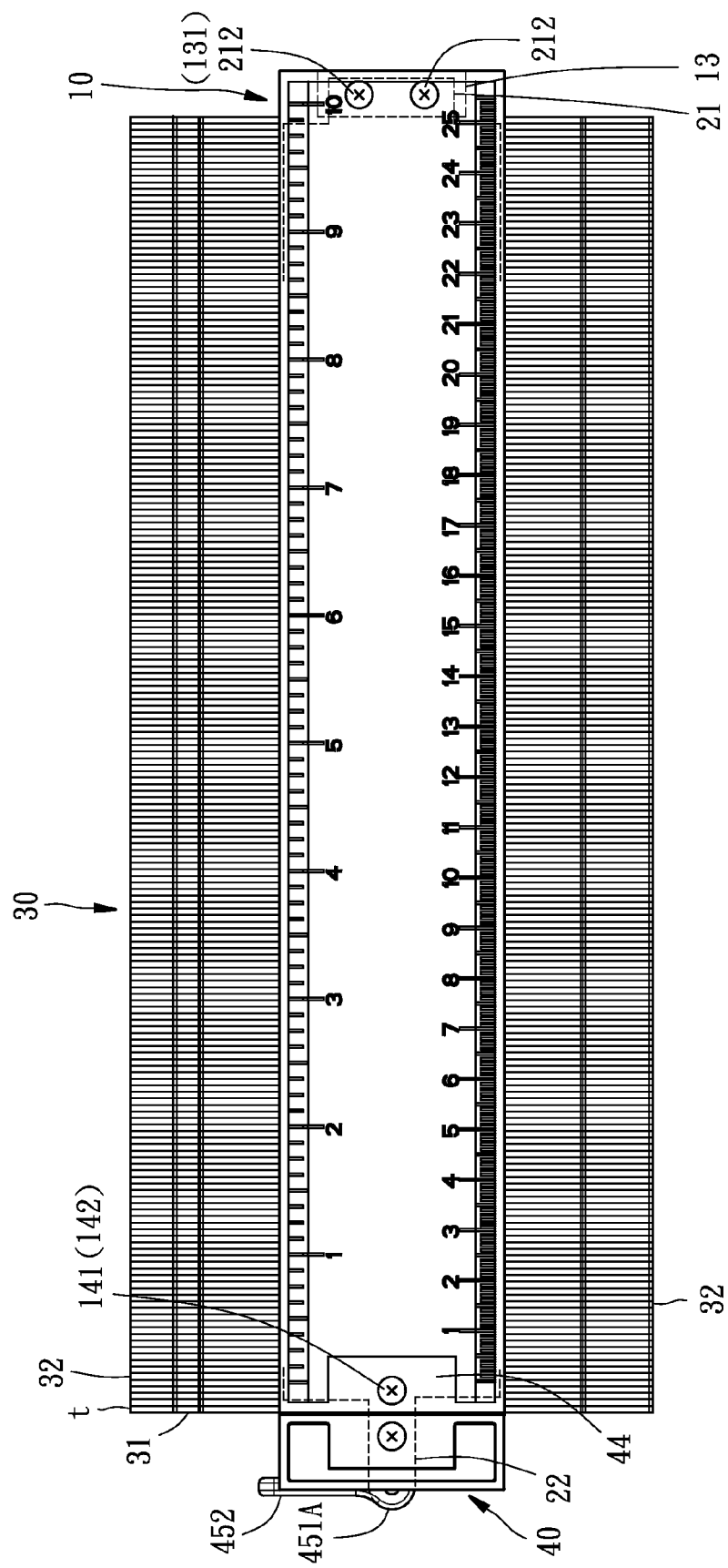
FIG. 3 is a plan view showing the assembly of the profile gauge according to the preferred embodiment of the present invention

Referring to FIGS. 2 and 3, the holding plate 20 is rectangular and includes an insertion 21 extending outwardly from a first end thereof, and the insertion 21 has two opposite first fixing orifices 211 defined thereon to connect with the positioning seat 13 of the body 10 by ways of two first screws 212. The holding plate 20 also includes an extension 22 extending outwardly from a second end thereof, and the extension 22 has a second fixing orifice 221 formed thereon.

Figure 4:
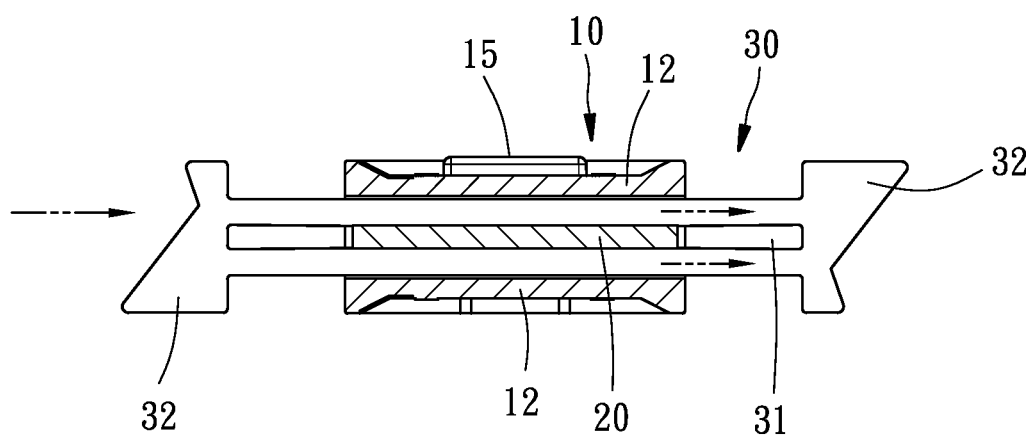
FIG. 4 is a cross sectional view showing a part of the operation of the profile gauge according to the preferred embodiment of the present invention.

As shown in FIGS. 2 to 4, each slidable measuring member 30 includes a fixed thickness t and an elongated aperture 31 defined thereon, wherein a width of the elongated aperture 31 is more than a width between the two sides of the holding plate 20, such that each slidable measuring member 30 is slidably inserted through the holding plate 20 by using the elongated aperture 31 (as illustrated in FIG. 4), and each slidable measuring member 30 also includes two contacting tabs 32 formed on an upper side and a lower side of two ends thereof.

Figure 6:
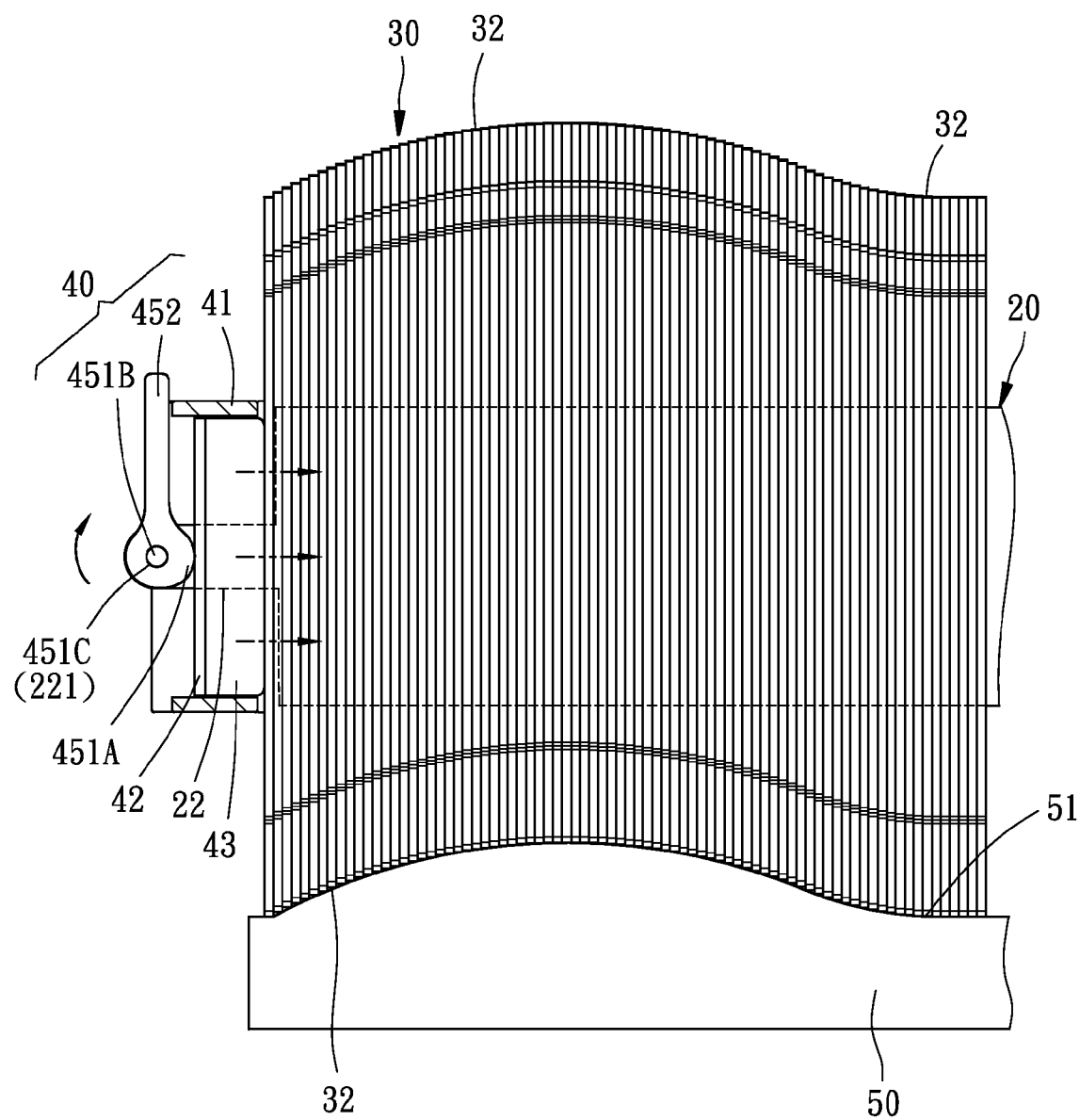
FIG. 6 is another plan view showing a part of the operation of the profile gauge according to the preferred embodiment of the present invention.

With reference to FIGS. 2, 3 and 6, the locking assembly 40 is fixed on the extension 22 of the holding plate 20 to limit a slidable movement of each slidable measuring member 30, such that each slidable measuring member 30 is slidably moved toward a measuring position of the object. The locking assembly 40 includes a connecting mount 41, a first press member 42, a second press member 43, two supporters 44, and an affixing member 45, wherein the connecting mount 41 has two support portions 412 symmetrically formed on two ends thereof, a receiving space 411 defined between the two support portions 412, two third screwing holes 413 formed on the two support portions 412 to connect the connecting mount 41 with the two supporters 44 by screwing with two second screws 414. The two supporters 44 are inserted into the two recesses 14 of the body 10, and a third screw 142 is screwed with the second screwing hole 141 of the body 10, such that the connecting mount 41 is mounted on an opening of the accommodating chamber 11 of the body 10. The first press member 42 and the second press member 43 are fixed below the connecting mount 41, and the first press member 42 has a first slot 421 arranged on an end portion thereof, the second press member 43 has a second slot 431 defined on an end portion thereof, such that the extension 22 of the holding plate 20 is inserted through the first slot 421 and the second slot 431. The affixing member 45 has a rotatable driving knob 451 and an operating lever 452 one piece formed with the rotatable driving knob 451, the rotatable driving knob 451 has an eccentric forcing rim 451A, a pore 451B, and a column 451C inserted into the second fixing orifice 221 of the extension 22, such that the affixing member 45 is connected with the extension 22, and the operating lever 452 is rotated to drive the rotatable driving knob 451 to downwardly force the first press member 42 and the second press member 43, and then the plurality of slidable measuring members 30 are pressed tightly by the first press member 42 and the second press member 43.

Figure 5:
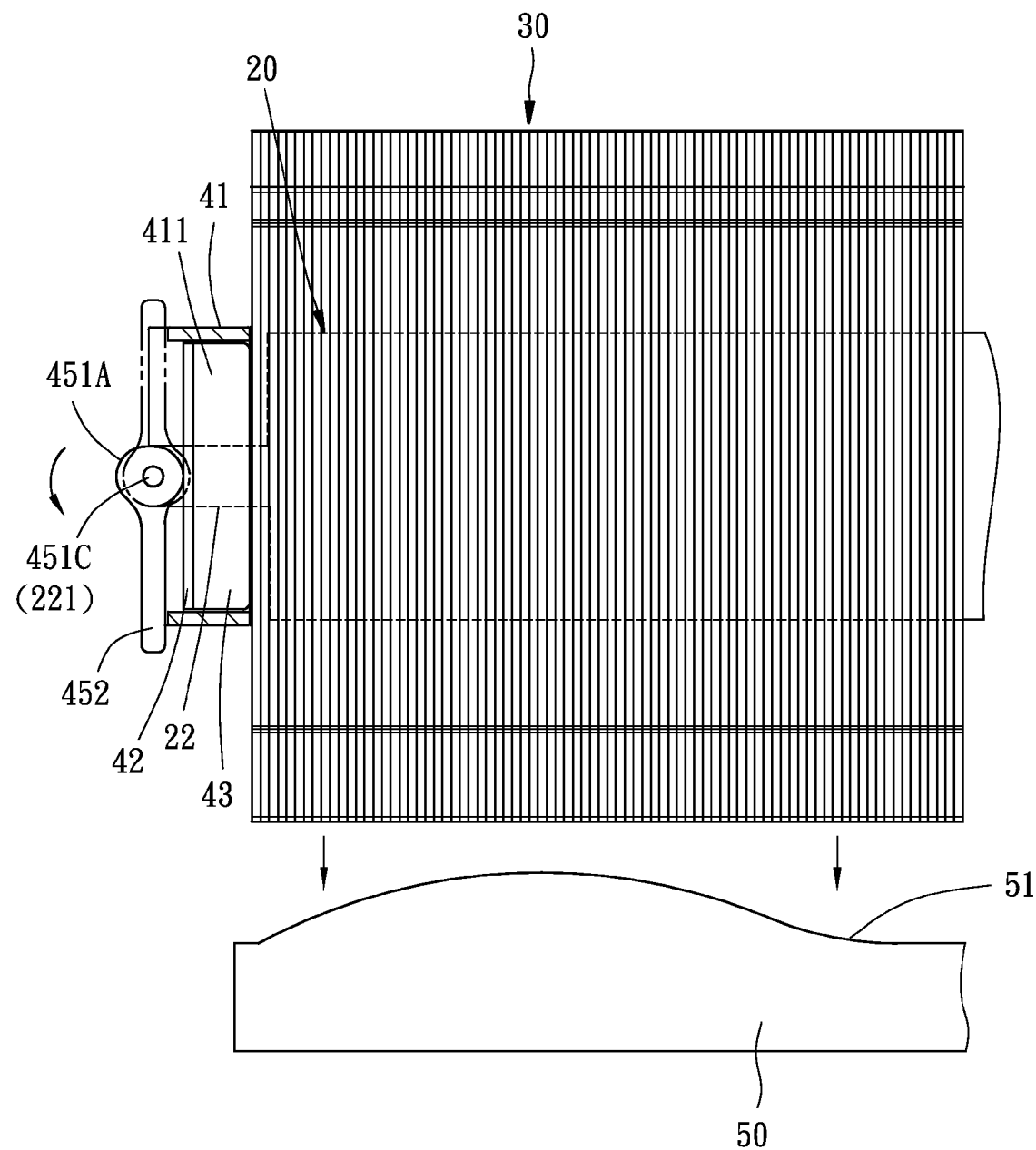
FIG. 5 is a plan view showing a part of the operation of the profile gauge according to the preferred embodiment of the present invention.

Referring to FIGS. 1 to 3, the plurality of slidable measuring members 30 are fixed on the holding plate 20, and any two of the plurality of slidable measuring members 3 keep a distance away, the holding plate 20 is accommodated in the accommodating chamber 11 of the body 10, such that when the operating lever 452 of the locking assembly 40 is rotated away from the body 10, the eccentric forcing rim 451A of the rotatable driving knob 451 rotates upwardly, as shown in FIG. 5. In the meantime, the first press member 42 and the second press member 43 are not forced by the rotatable driving knob 451, and each slidable measuring member 30 is in a free state, such that the two contacting tabs 32 of each slidable measuring member 30 is moved toward the object 50.

Thereafter, each slidable measuring member 30 is adjustably moved to align with a profile curve line 51 of the object 50. Referring further to FIG. 6, to maintain the profile curve line 51 unchanged, the eccentric forcing rim 451A of the rotatable driving knob 451 is rotated downwardly to drive the first press member 42 and the second press member 43, and then the first press member 42 and the second press member 43 press the plurality of slidable measuring members 30, thus fixing the profile curve line 51 unchanged quickly and easily.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:
1. A profile gauge comprising:
a body formed in an elongated plate shape and including a predetermined length, an accommodating chamber defined thereon, and two ruling portions parallelly arranged on two sides of the accommodating chamber; wherein each ruling portion has a graduation for measuring a distance between two points of a profile curve line of an object;
a holding plate being rectangular and including an insertion extending outwardly from a first end thereof and an extension extending outwardly from a second end thereof;
a plurality of slidable measuring members, each including a fixed thickness and an elongated aperture defined thereon, wherein a width of the elongated aperture is more than a width between the two sides of the holding plate;
a locking assembly fixed on the extension of the holding plate to limit a slidable movement of each slidable measuring member.

2. The profile gauge as claimed in claim 1, wherein the body also includes a positioning seat disposed on a bottom surface of a distal end thereof, and the positioning seat has a first screwing hole; the body further includes two recesses symmetrically formed on two ends thereof, and each recess has a second screwing hole; the body further includes plural magnets separately mounted on at least one of the two ruling portions thereof to magnetically attach the body on the object made of magnetic metal material.

3. The profile gauge as claimed in claim 1, wherein the locking assembly includes a connecting mount, a first press member, a second press member, two supporters, and an affixing member; wherein the connecting mount has two support portions symmetrically formed on two ends thereof, a receiving space defined between the two support portions, two third screwing holes formed on the two support portions to connect the connecting mount with the two supporters by screwing with two second screws; and the first press member has a first slot arranged on an end portion thereof, the second press member has a second slot defined on an end portion thereof; the affixing member has a rotatable driving knob and an operating lever one piece formed with the rotatable driving knob, the rotatable driving knob has an eccentric forcing rim, a pore, and a column inserted into the second fixing orifice of the extension.

\* \* \* \* \*